Patented May 30, 1967

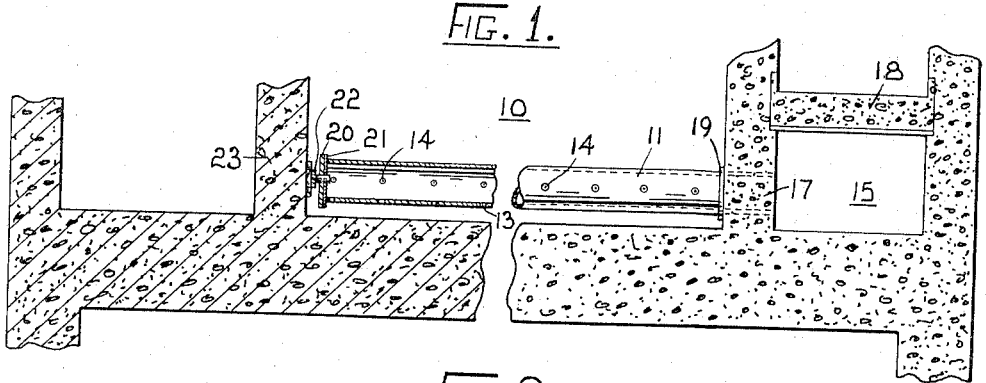
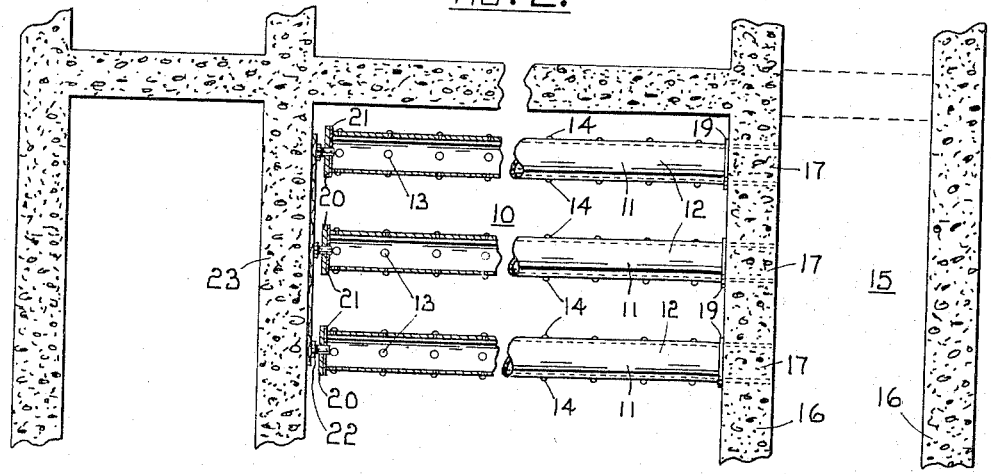
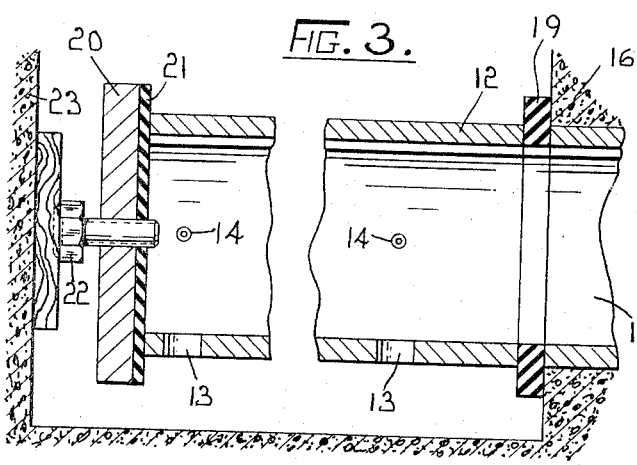
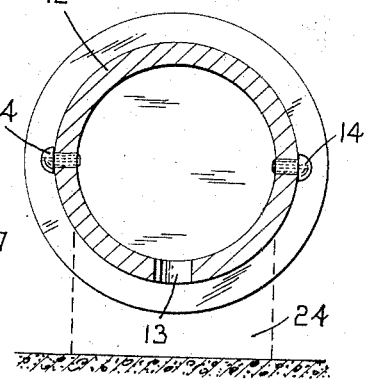

3,322,284
FILTER FLOORS
Richard P. Moore, Argosy House, Spilsbury St.,
Germiston, Transvaal, Republic of South Africa
Filed Feb. 18, 1964, Ser. No. 345,695
Claims priority, application Republic of South Africa,
Feb. 22, 1963, 63/755
2 Claims. (Cl. 210—274)

This invention relates to distribution means and collecting systems commonly provided in rapid sand or particle filters, for the purpose of collecting the filtered water from below the filter bed, supporting the filter media, and distributing the wash water evenly below the filter bed during backwashing or reverse flow of the water for cleansing purposes, as well as for distributing of air when this is utilized for agitation purposes of the filter media. Such distribution and collecting systems are commonly known as "filter floors."

This invention has particular reference to the type of filter floor in which distributing laterals or pipes transverse the plan area of the filter, and perform the common function of air and water distribution by means of suitably spaced orifices or nozzles. In such types of floor, good practice dictates a certain maximum spacing between the orifices or nozzles: furthermore, the even distribution of the air requires smaller separate orifices at a higher level than the water orifices or special "floor" nozzles, in which the air and water control orifices are suitably positioned. In all such known to the inventor, the air orifices or nozzles are positioned substantially at the top or vertical centre line of the pipe to achieve this objective. This means that the spacing of the laterals or pipes is dictated by the required spacing of the nozzles. For instance, if air distribution is required at 6" centres, the laterals would have to be spaced 6" apart.

Further, in order to ensure perfectly even distribution, the laterals or pipes have to be installed critically level, and since existing types of floors usually are permently fixed in position, this can lead to costly relaying in the event of errors in level during installation.

It is an object of the present invention to provide an improved type of filter floor in which fewer laterals are necessary than in the conventional filter floor.

It is a further object of the invention to provide a filter floor in which the laterals are easily movable.

According to the invention, the air distributing orifices or nozzles are positioned on the side of the distributing laterals.

Further according to the invention each lateral is mounted between resilient pads at least one of which is movable to adjust the position of the lateral.

To illustrate the invention an embodiment thereof is described hereunder with reference to the accompanying drawings in which:

FIGURE 1 shows a part sectional side view of a filter floor according to the invention;

FIGURE 2 is a plan view of FIGURE 1;

FIGURE 3 is an enlarged sectional side view of a lateral according to the invention; and FIGURE 4 is a sectional end view of FIGURE 3 showing the air distribution nozzles.

In the drawings a filter tank 10 (of which only a portion is shown) is provided with a filter floor designated generally as 11. The filter floor 11 comprises a number of laterals 12. Each lateral 12 is provided at its lower end with a number of evenly spaced holes 13. The holes 13 serve to collect the filtered water after it has passed through the filtering medium (not shown). The holes 13 also serve to feed water back into the filter medium for backwashing purposes.

A plurality of evenly spaced air distribution nozzles 14 are provided on each side of each lateral 12.

The nozzles 14 are located on the horizontal centre line of each lateral 12. The nozzles project into the cavity of the laterals and serve to introduce air into the water when backwashing to agitate the water. This agitation improves the cleansing action of the backwashing.

The filter tank 10 is provided with a collecting channel 15 which serves the dual purpose of backwash water collecting channel and wash water and filtered water collecting channel, such channel comprising two vertical walls 16 each provided with horizontally spaced orifices 17 at a suitable height above the true floor of the filter to receive the laterals 12. The space between the vertical walls 16 comprises the filtered water and wash water distributing channel, above which a horizontal dividing wall 18 is provided to separate the filtered water channel from the extended wash water collecting channel which is situated above and comprised by a vertical continuation of the said walls 16.

The distributing laterals 12 are connected to the orifices 17 in the walls 16 by means of a compressible joint ring 19 placed between the ends of the laterals 12 and the wall 16. Each lateral is held in position and closed at its opposite end by means of a vertical pressure plate 20 butting against the far end of the lateral 12 through a rubber joint ring 21. The ring 21 is provided with a bolt or bolts 22 adapted to screw against the adjacent wall 23 of the filter and thus compress the plate 20 against the joint ring 21 and incidentally, the lateral and the other joint ring 19 against the orifices 17 in the opposite channel wall 16. This maintains the lateral in position, at the same time providing a closure member for the far end of the lateral and permitting adjustment of the height of the lateral if necessary and removal of the lateral if ever required merely by release of the bolt or bolts 22.

Small grout pads 24 may be located under the laterals at intervals as additional support if required.

Primary distribution of air to the floor is achieved by two alternatives: either by a main air feed pipe connecting through the roof or the end of the main primary distributing channel, or alternatively by a transverse air pipe or pipes crossing above and at right angles to the laterals and connected to each through an orifice at the top of the lateral and the base of the air pipe. The orifices abut, and are threaded by a small tubular member provided with an angular rubber joint ring which provides an airtight joint between the pipe and the lateral.

A connection may be provided in the main distribution channel for venting residual air remaining in the upper part of the laterals and channel after air agitation, such venting to be effected prior to the admission of backwash water.

Alternatively, residual air venting may be effected by auxiliary air vent orifices positioned at the top of the laterals on the extremity furthest from the wash water sill.

The width of the laterals is such that air distributing orifices positioned on the sides and thereof, will be spaced a distance apart, equivalent to that normally requiring double the number of laterals with orifices on their vertical centre line.

Such laterals may comprise 4" or 5" internal diameter asbestos cement pipes with air distributing orifices positioned on the horizontal cross-section of the pipes, so as to utilize maximum width of the pipes and with water collecting orifices at the bottom of the pipes which are supported an inch or so from the true floor of the filter so as to permit the passage of water through these orifices. Such laterals spaced at 12" centres would provide air distribution substantially at 6" centres.

I claim:
1. A filter floor having distributing laterals traversing the plan area of the filter and performing the dual function of air and water distribution by means of suitably spaced orifices, wherein each lateral consists of a single pipe having the water orifices arranged along its underside and the air orifices arranged along each of its side walls and on the horizontal centre plane of the pipe.

2. A filter floor as claimed in claim 1 in which each lateral is mounted between resilient pads, at least one of which is movable to adjust the position of the lateral.

References Cited

UNITED STATES PATENTS

| | | | |
|---|---|---|---|
| 801,810 | 10/1905 | Parmelee | 210—279 X |
| 1,759,601 | 5/1930 | Apeldorn | 210—289 X |
| 2,108,087 | 2/1938 | Thayer | 210—289 X |
| 2,716,490 | 8/1955 | Barstow | 210—293 X |

FOREIGN PATENTS

| | | |
|---|---|---|
| 9,746 | 1913 | Great Britain. |
| 11,284 | 1913 | Great Britain. |

SAMIH N. ZAHARNA, *Primary Examiner.*